United States Patent [19]
DeMoss et al.

[11] Patent Number: 5,388,108
[45] Date of Patent: Feb. 7, 1995

[54] DELAYED INITIATION OF READ-MODIFY-WRITE PARITY OPERATIONS IN A RAID LEVEL 5 DISK ARRAY

[75] Inventors: Robert A. DeMoss, Wichita; Keith B. DuLac, Derby, both of Kans.

[73] Assignee: NCR Corporation, Dayton, Ohio

[21] Appl. No.: 966,106

[22] Filed: Oct. 23, 1992

[51] Int. Cl.$^6$ .............................................. G06F 11/00
[52] U.S. Cl. .................................... 371/51.1; 371/10.2
[58] Field of Search ..................... 371/10.1, 10.2, 40.2, 371/40.4, 49.1, 51.1; 395/425, 576

[56] References Cited
U.S. PATENT DOCUMENTS

| 4,884,271 | 11/1989 | Concha et al. | 371/40.2 |
| 4,914,656 | 4/1990 | Dunphy, Jr. et al. | 371/10.2 |
| 5,257,362 | 10/1993 | Menon | 371/40.2 |
| 5,265,098 | 11/1993 | Mattson et al. | 371/10.2 |

OTHER PUBLICATIONS

"A Case for Redundant Arrays of Inexpensive Disks (Raid)" by David Patterson et al. ACM Cont., Chicago Ill. Jun. 1988.

*Disk Arrays Explained* by Roger C. Alford, Oct. 1992 issue of Byte magazine.

*Primary Examiner*—Vincent P. Canney
*Attorney, Agent, or Firm*—James M. Stover

[57] ABSTRACT

An improved method for updating data and parity information in a RAID level 4 or 5 disk array employing a read-modify-write (RMW) process for updating data and parity information. During normal RMW operations, the old data and old parity information to be updated are read from disk, new parity is generated, and the new parity information and new data written to disk. The improved RMW method separates the execution of data read and write operations from the execution of parity read, generation and write operations to permit greater efficiency in the utilization of the drives within the array. The method identifies the disk drives containing the data and parity to be updated and places the proper read and write requests into the I/O queues for the identified data and parity drives, scheduling parity operations; i.e. reading old parity information from the parity drive, generating new parity information and writing the new parity information to the parity drive; for execution when best accommodated in the I/O queue for the parity drive, following the read of old data from the data drive.

7 Claims, 8 Drawing Sheets

DELAYED INITIATION OF READ-MODIFY-WRITE PARITY OPERATIONS IN A RAID LEVEL 5 DISK ARRAY

The present invention relates to disk array storage devices for computer systems and, more particularly, to a method for improving disk array I/O operations.

BACKGROUND OF THE INVENTION

RAID (Redundant Array of Inexpensive Disks) storage systems have emerged as an alternative to large, expensive disk drives for use within present and future computer system architectures. A RAID storage system includes an array of small, inexpensive hard disk drives, such as the 5 ¼ or 3 ½ inch disk drives currently used in personal computers and workstations. Although disk array products have been available for several years, significant improvements in the reliability and performance of small disk drives and a decline in the cost of such drives have resulted in the recent enhanced interest in RAID systems.

Current disk array design alternatives are described in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks. Five disk array arrangements, referred to as RAID levels, are described. The simplest array, a RAID level 1 system, comprises one or more disks for storing data and an equal number of additional "mirror" disks for storing copies of the information written to the data disks. The remaining RAID levels, identified as RAID level 2, 3, 4 and 5 systems, segment the data into portions for storage across several data disks. One or more additional disks are utilized to store error check or parity information. The present invention is directed to improvements in the operation of RAID level 4 and 5 systems.

A RAID level 4 disk array is comprised of N+1 disks wherein N disks are used to store data, and the additional disk is utilized to store parity information. Data to be saved is divided into portions consisting of one or many blocks of data for storage among the disks. The corresponding parity information, which can be calculated by performing a bit-wise exclusive-OR of corresponding portions of the data stored across the N data drives, is written to the dedicated parity disk. The parity disk is used to reconstruct information in the event of a disk failure. Writes typically require access to two disks, i.e., one of the N data disks and the parity disk, as will be discussed in greater detail below. Read operations typically need only access a single one of the N data disks, unless the data to be read exceeds the block length stored on each disk.

RAID level 5 disk arrays are similar to RAID level 4 systems except that parity information, in addition to the data, is distributed across the N+1 disks in each group. Each one of the N+1 disks within the array includes some blocks for storing data and some blocks for storing parity information. Where parity information is stored is controlled by an algorithm implemented by the user. As in RAID level 4 systems, RAID level 5 writes typically require access to two disks; however, no longer does every write to the array require access to the same dedicated parity disk, as in RAID level 4 systems. This feature provides the opportunity to perform concurrent write operations.

Figure 1:
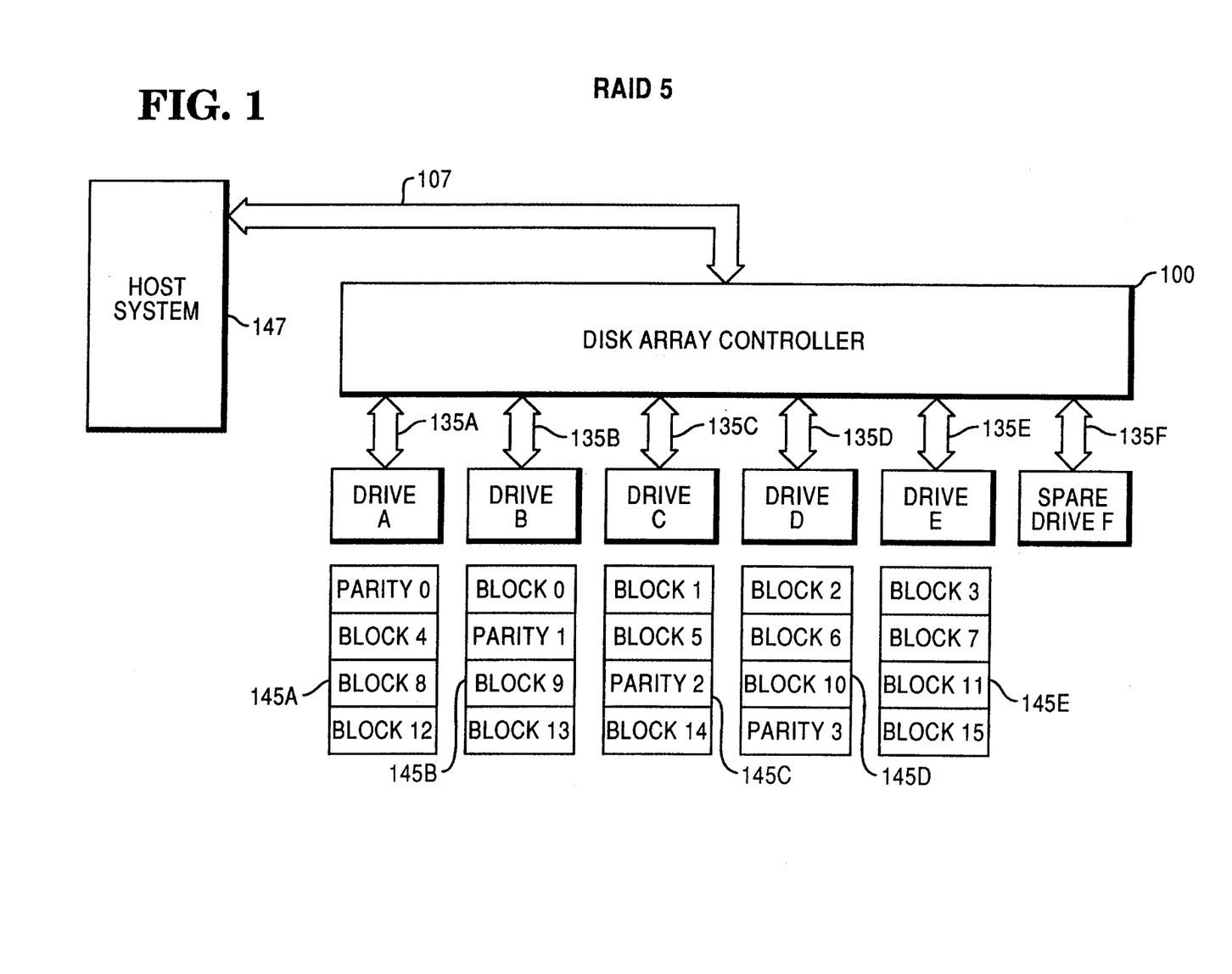
FIG. 1 is a block diagram representation of a RAID level 5 array including six disk drives.

A RAID level 5 system including five data and parity disk drives, DRIVE A through DRIVE E, and a spare disk drive, DRIVE F, is illustrated in FIG. 1. An array controller 100 coordinates the transfer of data between the host system 147 and the array disk drives. The controller also calculates and checks parity information. Blocks 145A through 145E illustrate the manner in which data and parity is stored on the five array drives. Data blocks are identified as BLOCK 0 through BLOCK 15. Parity blocks are identified as PARITY 0 through PARITY 3. The relationship between the parity and data blocks is as follows:

PARITY 0 = (BLOCK 0) XOR (BLOCK 1) XOR (BLOCK 2) XOR (BLOCK 3)
PARITY 1 = (BLOCK 4) XOR (BLOCK 5) XOR (BLOCK 6) XOR (BLOCK 7)
PARITY 2 = (BLOCK 8) XOR (BLOCK 9) XOR (BLOCK 10) XOR (BLOCK 11)
PARITY 3 = (BLOCK 12) XOR (BLOCK 13) XOR (BLOCK 14) XOR (BLOCK 15)

As stated above, parity data can be calculated by performing a bit-wise exclusive-OR of corresponding portions of the data stored across the N data drives. However, because each parity bit is simply the exclusive-OR product of all the corresponding data bits from the data drives, new parity can be more easily determined from the old data and the old parity as well as the new data in accordance with the following equation:

new parity = (old data XOR new data) XOR old parity.

Although the parity calculation for RAID levels 4 or 5 shown in the above equation is much simpler than performing a bit-wise exclusive-OR of corresponding portions of the data stored across all of the data drives, a typical RAID level 4 or 5 write operation will require a minimum of two disk reads and two disk writes. More than two disk reads and writes are required for data write operations involving more than one data block. Each individual disk read operation involves a seek and rotation to the appropriate disk track and sector to be read. The seek time for all disks is therefore the maximum of the seek times of each disk. A RAID level 4 or 5 system thus carries a significant write penalty when compared with a single disk storage device or with RAID level 1, 2 or 3 systems.

OBJECTS OF THE INVENTION

It is therefore an object of the present invention to provide a new and useful method for updating data and parity information within a disk array.

It is another object of the present invention to provide such a method which optimally executes read-modify-write procedures within RAID level 4 and 5 disk arrays.

It is yet another object of the present invention to provide a new and useful method for improving the efficiency of disk drive utilization within a disk array.

It is still a further object of the present invention to provide a new and useful method for minimizing I/O service times and I/O queue waiting times for individual drives within a disk array.

SUMMARY OF THE INVENTION

There is provided, in accordance with the present invention, an improved method for updating data and parity information in a disk array employing a read-modify-write (RMW) process for updating data and parity information. A read-modify-write process includes the steps of (a) reading old data and old parity information from the first and second disk drives, respectively, (b) generating new parity information from the old data, new data received by the disk array, and the old parity information, and (c) writing the new data and new parity information to the first and second disk drives, respectively. The improved RMW method described herein delays the old parity read, new parity generation, and new parity write procedures until the conclusion of old data read procedures.

The method described herein is implemented within an array controller for a RAID level 5 disk array. Upon receipt of new data from a host system, the array controller identifies the disk drives containing the data and parity to be updated and places the proper read and write requests into the I/O queues for the identified data and parity drives. I/O operations are scheduled such that the controller first reads old data from the data drive and writes the new and old data to first and second areas, respectively, within a storage buffer. The controller then writes the new data to the data drive. Parity operations; i.e. reading old parity information from the parity drive and saving the old parity information to third area within the storage buffer, combining the old parity information with the old and new data to generate new parity information (new parity=old data XOR new data XOR old parity information), and writing the new parity information to the parity drive; are scheduled for execution when best accommodated in the I/O queue for the parity drive, following the read of old data from the data drive.

The above objects and other objects, features, and advantages of the present invention will become apparent from the following detailed specification when read in conjunction with the accompanying drawings in which applicable reference numerals have been carried forward.

BRIEF DESCRIPTION OF THE INVENTION

DETAILED DESCRIPTION OF THE PREFERRED EMBODIMENT

Array Controller Architecture

Figure 2A:
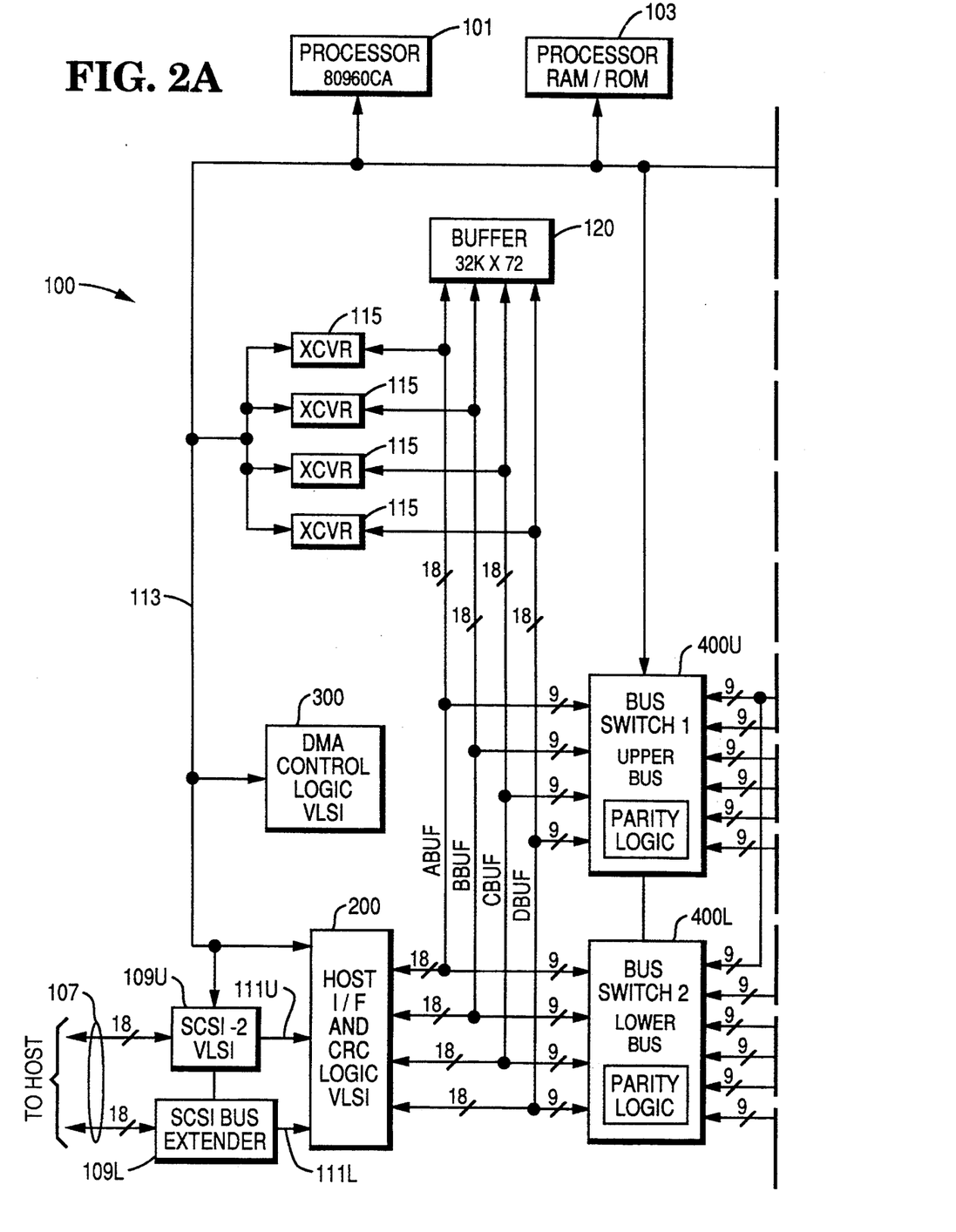
FIGS. 2A and 2B illustrate in block diagram form one possible architecture for disk array controller 100 shown in FIG. 1.
Figure 2B:
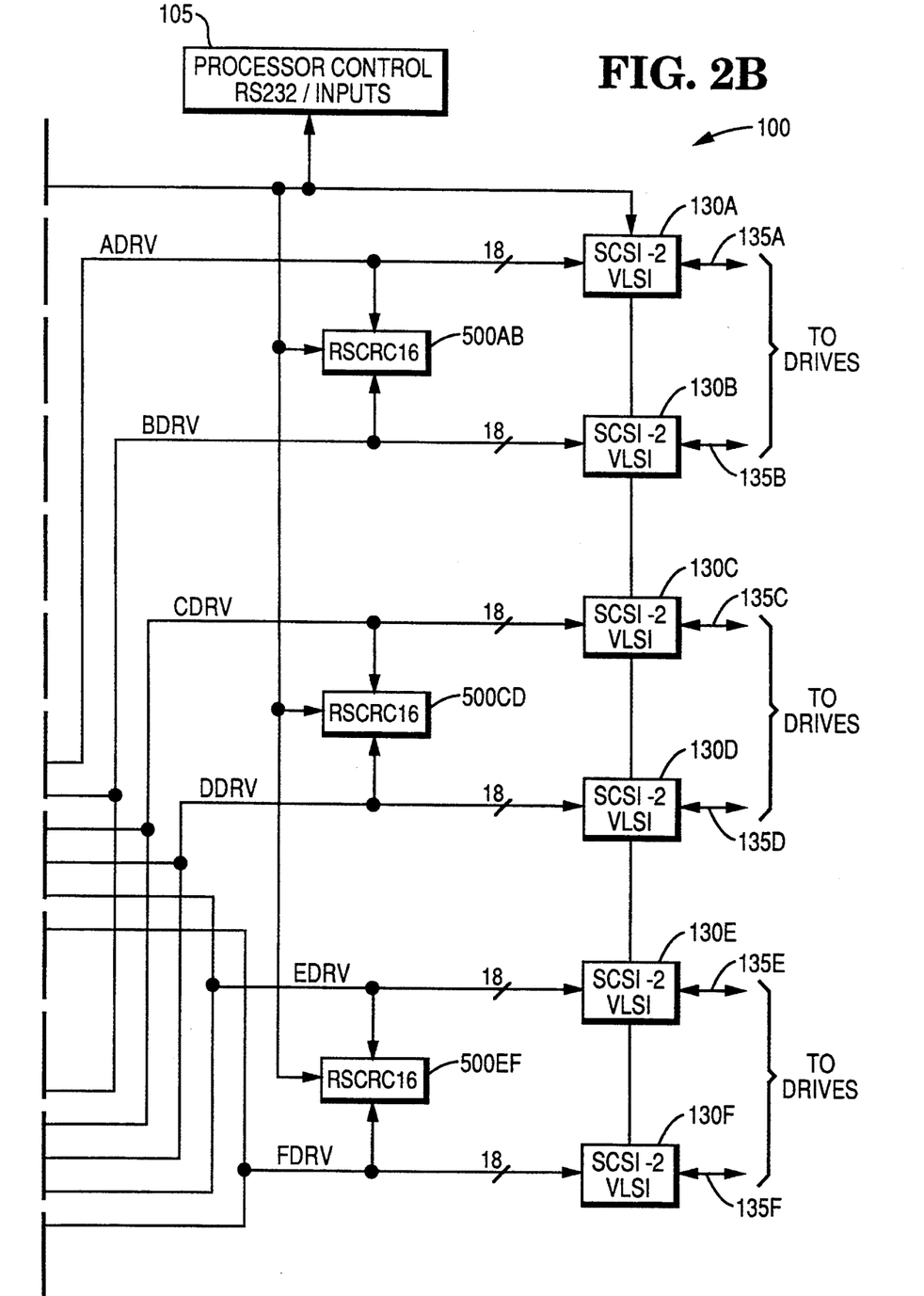

Referring now to FIGS. 2A and 2B, the architecture of a disk array controller 100 for a RAID system is shown in block diagram form. The array controller coordinates the operation of the multitude of disk drives within the array to perform read and write functions, parity generation and checking, and data restoration and reconstruction. The controller exchanges data with the host computer system (not shown) through Host Interface and CRC Logic block 200. Host I/F Logic block 200, under the control of processor 101, interfaces an external 18-bit or 36-bit wide, SCSI-2 bus 107 associated with the host system with four internal 18-bit wide buffer busses ABUF, BBUF, CBUF and DBUF. Bus 107 connects to Host I/F Logic block 200 through a standard SCSI-2 chip set, represented by blocks 109U and 109L and eighteen-bit busses 111U and 111L. Interconnection between block 200 and processor 101 is provided by address/data bus 113.

Host I/F Logic block 200 operates to multiplex data between SCSI-2 devices 109U and 109L and the four buffer busses ABUF, BBUF, CBUF and DBUF. Block 200 provides multiplexing functionality between busses 111U and 111L and (1) all four buffer busses for 4+1 RAID level 3 and high bandwidth RAID level 5 applications by word stripping data across the four buffer busses in a rotating sequential order, (2) one of two defined pairs of buffer busses for 2+1 RAID level 3 applications by word stripping data across the pair of buffer busses in a rotating sequential order, of (3) any one of the buffer busses for RAID level 1 and single bus RAID level 5 applications.

Internal buffer busses ABUF, BBUF, CBUF and DBUF connect Host I/F Logic block 200 with a RAM buffer 120 and upper and lower byte bus switches 400U and 400L. Buffer 120 possesses the capability to read and write 72-bit wide words from the four buffer busses, or individual 18-bit wide words from any one of the buffer busses. Eighteen or 36-bit access is also provided through transceivers 115 to bus 113.

Figure 3:
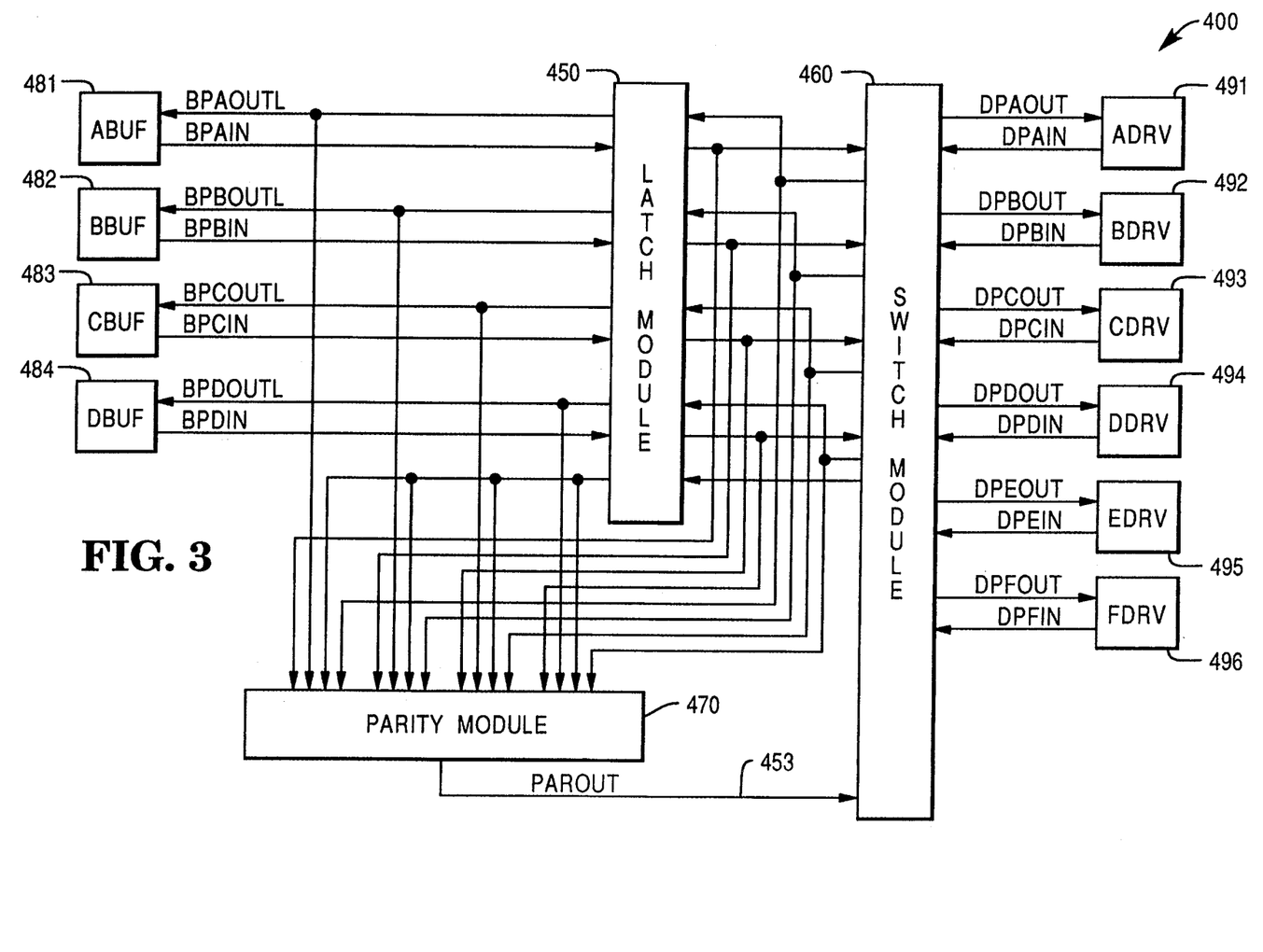
FIG. 3 is a block diagram illustration of the logic included within Bus Switch block 400U shown in FIGS. 2A and 2B.

Bus switches 400U and 400L provides variable bus mapping between buffer busses ABUF, BBUF, CBUF and DBUF and six 18-bit wide drive busses labeled ADRV, BDRV, CDRV, DDRV, EDRV and FDRV, each switch providing routing for one byte (eight bits data and one bit parity) of information. Bus switches 400U and 400L further include the capability to generate parity information, which may be directed onto any of the buffer or drive busses, check parity information and reconstruct information stored on a failed disk drive. FIG. 3, discussed below, provide greater detail concerning the construction and operation of bus switches 400U and 400L.

Each one of drive busses ADRV, BDRV, CDRV, DDRV, EDRV and FDRV is connected to an associated SCSI-2 device, labeled 130A through 130F, which provide connection to six corresponding disk drives (not shown) forming the disk array. The six drives will be identified herein as drives A through F. Reed-Solomon Cyclic Redundancy Check (RSCRC) logic blocks 500AB, 500CD and 500EF are connected between busses ADRV and BDRV, CDRV and DDRV, and EDRV and FDRV, respectively, to provide error detection and generation of Reed-Solomon CRC for the array controller.

The control of Host I/F Logic block 200; bus switches 400U and 400L; RSCRC logic blocks 500AB, 500CD and 500EF; and SCSI devices 109U, 109L, and 130A through 130F is provided by microprocessor 101. Communication between microprocessor 101, associated processor memory 103 and processor control inputs 105 and the above-identified elements is provided by address/data bus 113. Also shown connected to bus 113 is DMA Control Logic block 300. The logic within block 300 provides DMA control for Host I/F Logic block 200, bus switches 400U and 400L, SCSI-2 devices 130A through 130F and processor 101.

The controller architecture shown in FIGS. 2A and 2B can be configured to accommodate different quantities of disk drives and also to accommodate different RAID configurations. Additional detail concerning the structure and operation of the disk array controller discussed above and shown in FIGS. 2A and 2B is provided in U.S. patent application Ser. No. 07/746,399, filed on Aug. 16, 1991, incorporated herein by reference. U.S. patent application Ser. No. 07/746,399, entitled "Disk Array Controller Architecture," is assigned to NCR Corporation.

Bus Switch Architecture

The logic included within each one of bus switches 400U and 400L is shown in the block diagram of FIG. 3. The structure shown is formed upon a single semiconductor chip. The four host ports, labeled 481 through 484, provide connection to the four controller busses ABUF, BBUF, CBUF and DBUF, respectively. The array ports, identified by reference numerals 491 through 496, connect with the six disk drive busses ADRV, BDRV, CDRV, DDRV, EDRV and FDRV, respectively. Bus switches 400U and 400L operate together to provide a unidirectional connection between any one of controller buses ABUF, BBUF, CBUF and DBUF and any one of drive buses ADRV, BDRV, CDRV, DDRV, EDRV and FDRV. Multiple connections between several controller busses and an equal number of drive busses is also permitted. Additionally, the bus switches may provide unidirectional connection of any controller bus to two or more drive busses. Parity information obtained via bus 453 can also be ported to any one of the drive busses.

The architecture of each bus switch is composed of three primary blocks: a latch module 450, switch module 460, and a parity module 470. Switch module 460 is connected between controller busses ABUF, BBUF, CBUF and DBUF and drive busses ADRV, BDRV, CDRV, DDRV, EDRV and FDRV. An additional bus 453 connects parity module 470 to bus switch module 460. Several functions are provided by bus switch module 460. First, bus switch module 460 provides a unidirectional connection between any controller bus and any drive bus. Multiple connections between several controller busses and an equal number of drive busses is also permitted.

Second, the bus switch module provides connection between any two or more of the drive busses. Such an operation is necessary for the transfer of information between disk drives without interfering with host or controller operations.

Third, bus switch module 460 provides connection between any two or more of the controller busses. This mode of operation supports data reorganization on the controller by allowing data to be propagated from one controller bus to another. This mode of turnaround operation is also advantageous for BIST (Built-In Self Test) development.

Finally, the bus switch module provides unidirectional connection of any controller bus to one or more drive busses. Parity information obtained via bus 453 can also be ported to any one of the drive busses.

Parity module 470 includes connections to each of the controller busses for receiving data therefrom and a connection to bus 453 for providing parity information to bus switch module 460. Parity module 470 generates parity information for RAID level 3, 4 and 5 operations by performing a bit-wise exclusive-OR of each active controller bus. The parity information is provided to bus switch module 460 via bus 453.

Additional detail concerning the structure and operation of bus switches 400U and 400L discussed above and shown in FIG. 3 is provided in U.S. patent application Ser. No. 07/701,921, filed on May 17, 1991, incorporated herein by reference. U.S. patent application Ser. No. 07/701,921, entitled "Multi-Channel Data And Parity Exchange Device," is assigned to NCR Corporation.

Raid Level 5 Read-Modify-Write Operation

Figure 4:
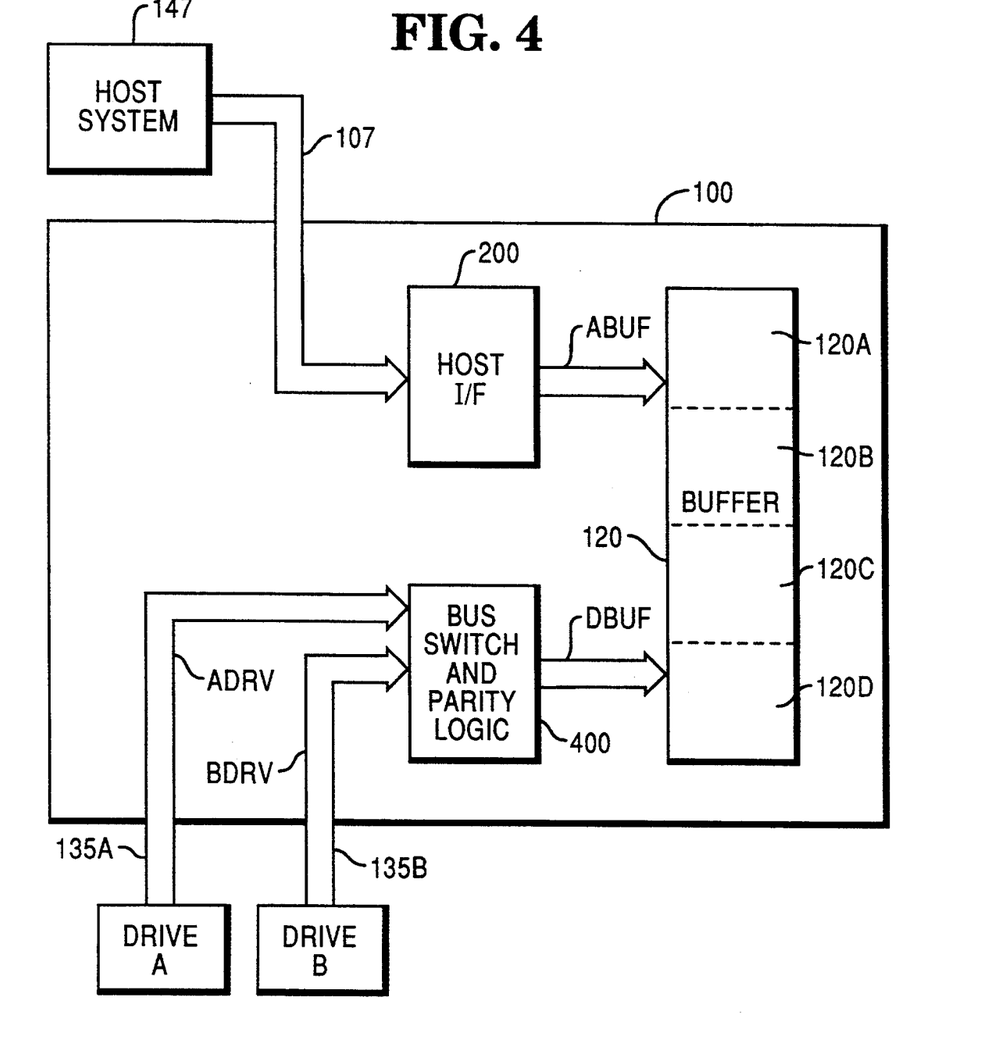
FIGS. 4 and 5 illustrate a RAID level 5 read-modify-write operation
Figure 5:
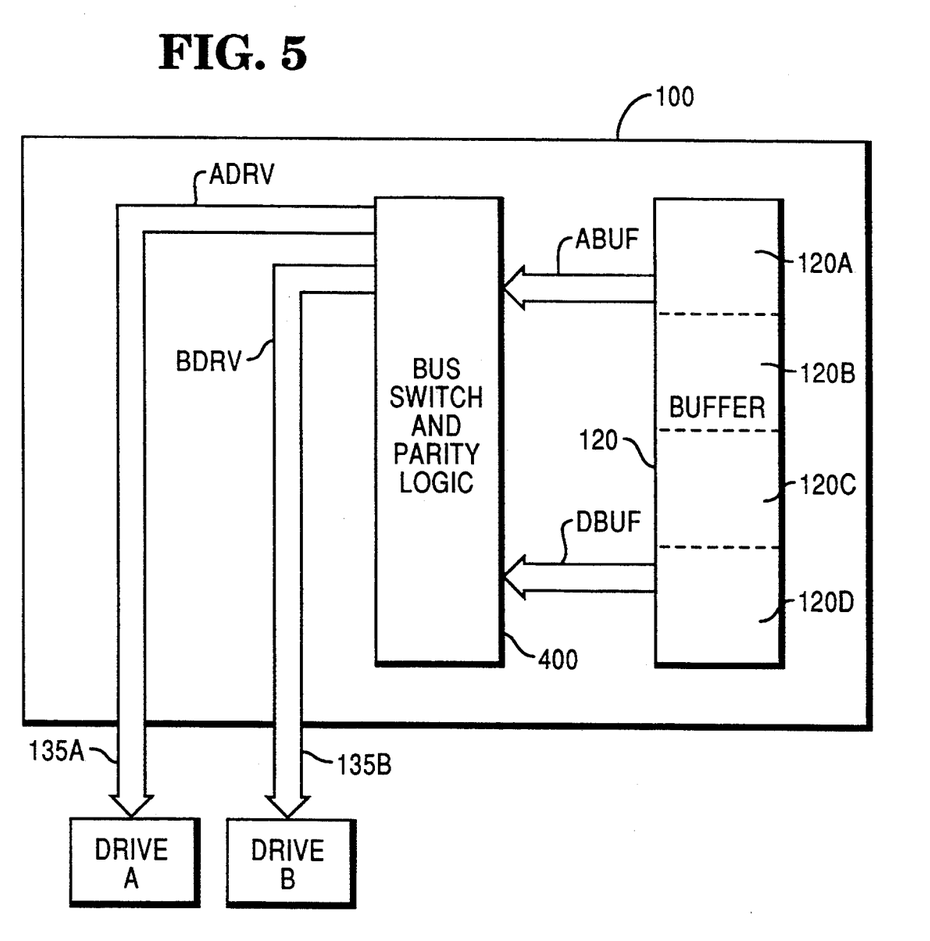

FIGS. 4 and 5 illustrate a RAID level 5 write involving DRIVE A and DRIVE B, wherein data is to be written to DRIVE B and parity information is to be updated on DRIVE A. Only structure required to facilitate the read-modify-write (RMW) operation is shown in FIGS. 4 and 5.

Under direction of the controller processor, not shown, old data and parity information are first read from the two drives as shown in FIG. 4. The old data and parity are read from the target areas within drives DRIVE B and DRIVE A, respectively, and routed via buses 135B and 135A to bus switch 400. Bus switch 400 is configured to combine the received data and parity to generate the exclusive-OR product: old data XOR old parity. This product is stored in a first area 20D within buffer 120. New data received from host system 147 is concurrently saved to a second area 120A within buffer 120.

New data and parity information is then written to DRIVE B and DRIVE A as shown in FIG. 5. Bus switch 400 is reconfigured to route the new data read from area 120A in storage buffer 120 to DRIVE B. Bus switch 400 is further configured to generate new parity information by combining the new data with the previously saved product, old data XOR old parity, stored in storage buffer area 120D. The result, old data XOR old parity XOR new data, is written to DRIVE A.

Modified Raid Level 5 Write Operation

FIGS. 6 through 9 illustrate the modified RAID level 5 write operation wherein parity write operations are delayed in accordance with the method of the present invention. As with FIG. 4 and 5, only structure required to facilitate the write operation is shown in FIGS. 6 through 9.

Figure 6:
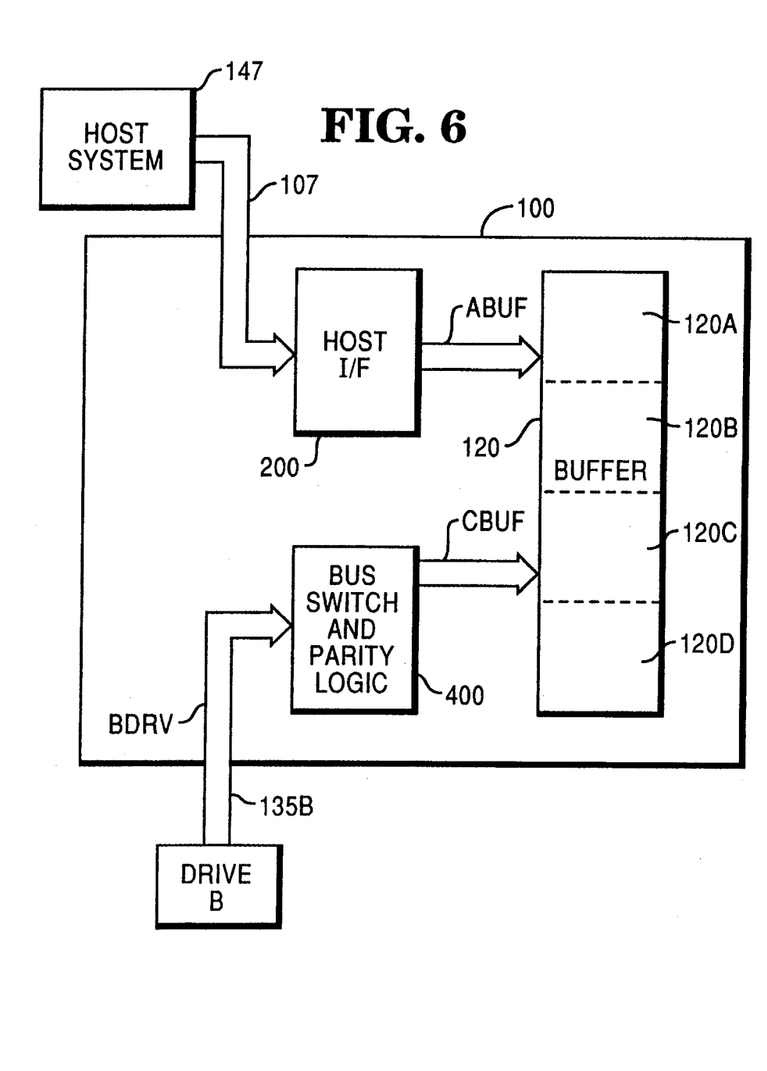
FIGS. 6 through 9 illustrate the modified RAID level 5 write operation wherein parity write operations are delayed in accordance with the method of the present invention.
Figure 7:
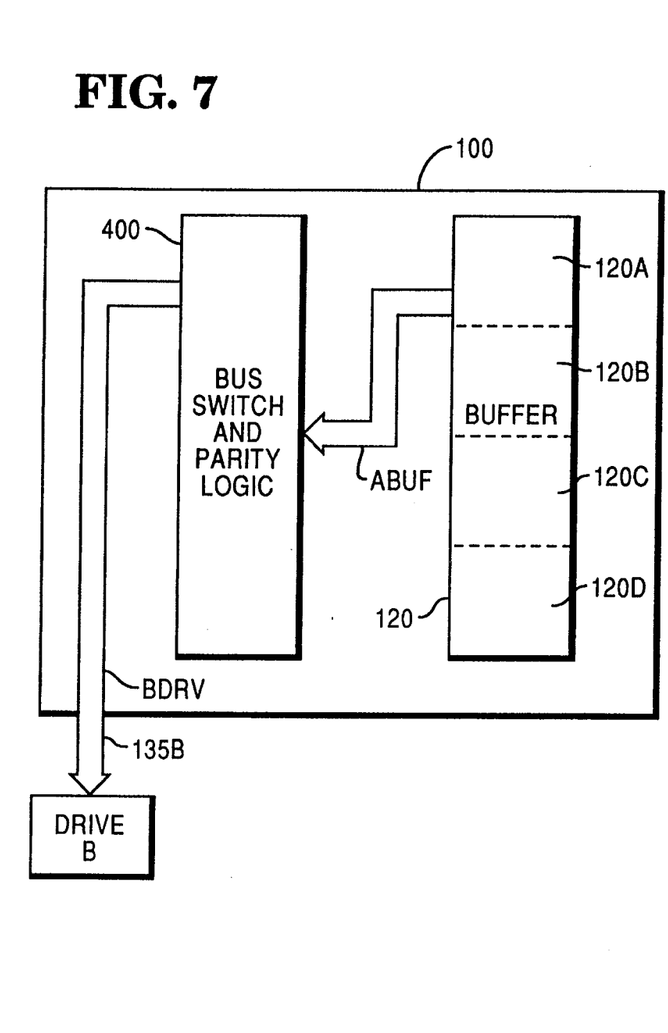

FIG. 6 illustrates the first step in the modified RAID level 5 write operation. During this first step old data received from disk storage and new data received from the host system is saved to buffer 120. In FIG. 6, the new data received from host system 147 is directed through host I/F logic 200 and buffer bus ABUF to a first storage area within buffer 120. Old data is read from DRIVE B and routed via drive buses 135B and BDRV, bus switch 400 and buffer bus DBUF to a second storage area within buffer 120. The new data received from host system 147 is directed through host I/F logic 200 and buffer bus ABUF to a second storage area within buffer 120. Bus switch 400 is thereafter reconfigured and the new data stored in buffer 120 is written to DRIVE B as shown in FIG. 7.

Figure 8:
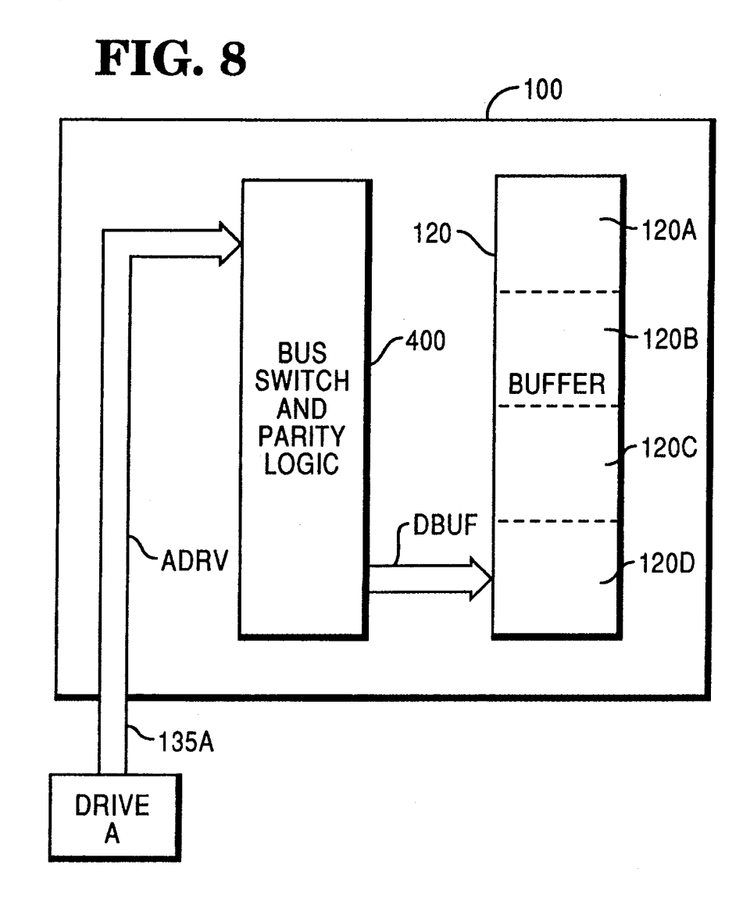
Figure 9:
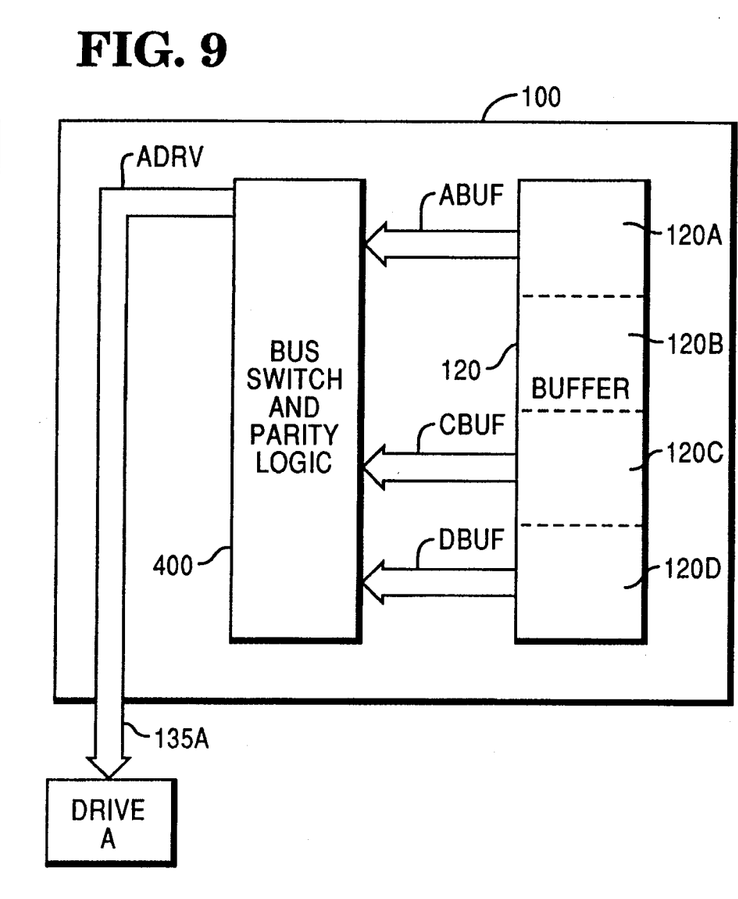

Old parity is read from Drive A and written to area 120D within buffer 120 as shown in FIG. 8. This step may be performed concurrently with, or at any point after, the operation shown in FIG. 6 wherein old data is read from DRIVE B and saved to storage buffer 120. Bus switch 400 is thereafter configured to generate new parity information by combining the new data from storage area 120A, old data from storage area 120C and the old parity from storage area 120D as shown in FIG. 9. The result, old data XOR old parity XOR new data, is written to DRIVE A. The new parity write operation shown in FIG. 9 may be performed immediately upon the conclusion of the old parity read operation shown in FIG. 8, or may be delayed for execution at a more suitable time.

Separating the DRIVE B (data) and DRIVE A (parity) read and write operations allows for more efficient utilization of the disk drives. In the RMW procedure shown in FIGS. 4 and 5 and discussed above, a delay in obtaining access to either the parity or data drives delays the entire RMW operation. Data on DRIVE B is updated as soon as the drive is available; the update is not delayed in the event the parity drive, DRIVE A, is unavailable. Similarly, DRIVE A operations will not be stayed should DRIVE B be unavailable.

By delaying the parity read and write operations involving DRIVE A, the method of the present invention permits utilization of DRIVE A for other input/output operations until such time as the parity read, generate and write operations (FIGS. 8 and 9) can proceed efficiently without inducing disk service time penalties.

Scheduling of disk read and write operations is coordinated by the array controller which maintains separate I/O queues for each drive within the array. The method identifies the disk drives containing the data and parity to be updated, drives DRIVE B and DRIVE A in the example described above, and places the proper read and write requests into the I/O queues for the identified data and parity drives, scheduling parity operations; i.e. reading old parity information from DRIVE A, generating new parity information and writing the new parity information to DRIVE A; for execution when best accommodated in the I/O queue for DRIVE A, following the read of old data from DRIVE B.

In addition, in order to minimize the overall response time seen by the host system upon issuing a write request, the modified write routine may include procedures for reporting write completion status to the host system just after the write of data to DRIVE B is completed, without waiting for the associated parity generation and write to DRIVE A to complete.

To assure data reliability and integrity of parity in the array in the event of an array or drive failure, the array controller maintains a status table which identifies the pending parity blocks. Moreover, this status table should be placed in a safe secondary storage device, apart from the array controller, so as to survive a controller failure and allow recovery.

It can thus be seen that there has been provided by the present invention a method which improves the efficiency of disk drive utilization within a disk array, minimizing I/O service times and I/O queue waiting times for individual drives within the disk array. Although a RAID level 5 system including an array controller and five disk drives for the storage of data and parity information is shown in the Figures, and discussed above, those skilled in the art will recognize that the invention is not limited to the specific embodiment described above and that numerous modifications and changes are possible without departing from the scope of the present invention. For example, the method may be utilized to improve the performance of RAID level 4 and other disk array systems. The method may also be employed by the host system processor for those disk array systems not including a dedicated array controller.

Additional array performance benefits are realized by employing the present invention together with the method disclosed in U.S. application Ser. No. 07/966,107, titled "Fast Write I/O Handling in a Disk Array" by Keith Bernard DuLac and Robert Allen DeMoss, the disclosure of which is hereby incorporated by reference. U.S. application Ser. No. 07/966,107 discloses a method for reducing mean write I/O response time for a disk array within a data processing system through utilization of one or more spare disk drives within the disk drive for rapid temporary storage of I/O write data. When utilized in conjunction with the method disclosed in U.S. application Ser. No. 07/966,107, the present invention obtains new data from an array spare drive rather than directly from the host system.

U.S. application Ser. No. 07/966,107, filed concurrently herewith, is assigned to NCR Corporation.

These and other variations, changes, substitution and equivalents will be readily apparent to those skilled in the art without departing from the spirit and scope of the present invention. Accordingly, it is intended that the invention to be secured by Letters Patent be limited only by the scope of the appended claims.

What is claimed is:

1. A method for updating data and associated parity information stored upon first and second disk drives, respectively, within a disk array upon the receipt of new data from a host system, said method comprising the steps of:

(A) reading old data from said first drive and saving said old data to a first storage buffer;

(B) writing said new data to a second storage buffer;

(C) replacing said old data residing on said first drive with said new data;

(D) issuing a write complete status signal indicating completion of said host write operation to said host system;

(E) generating new parity information after the conclusion of step B;

(F) replacing said old parity information residing on said second drive with said new parity information.

2. The method according to claim 1, wherein said step of generating new parity information (step E) includes the step of:

reading old parity information from said second drive: and combining said old parity information with said old data and said new data stored within said first and second storage buffers, respectively, to generate new parity information, said new parity information being the product: old data XOR new data XOR old parity information.

3. The method according to claim 1, wherein said disk array comprises a RAID level 5 disk array.

4. A method for updating data and associated parity information stored upon first and second disk drives, respectively, within a disk array, said method comprising the steps of:

(A) reading old data from said first drive and saving said old data to a first storage buffer;

(B) writing new data to a second storage buffer;

(C) replacing said old data residing on said first drive with said new data;

(D) reading old parity information from said second drive after the conclusion of said step of replacing said old data residing on said first drive with said new data (step A) and saving said old parity information to a third storage buffer;

(E) reading said old data, said new data and said old parity information from said first, second and third storage buffers, respectively, and combining said old data, said new data and said old parity information to generate new parity information, said new parity information being the product: old data XOR new data XOR old parity information; and (F) replacing said old parity information residing on said second drive with said new parity information.

5. The method according to claim 4, further including the step of:

issuing a write complete status signal indicating completion of said host write operation to said host system upon the conclusion of said step of replacing said old data residing on said first drive with said new data (step C).

6. In a disk array employing a read-modify-write method for updating data and parity information stored upon first and second disk drives, respectively, wherein (a) old data and old parity information are read from said first and second disk drives, respectively, (b) new parity information is generated, and (c) new data and said new parity information are written to said first and second disk drives, respectively, the improvement comprising:

placing a first I/O request to read said old data from said first disk drive, and a second I/O request to write said new data to said first disk drive, into a first queue associated with said first disk drive, said first queue defining the order of execution of I/O requests for said first disk drive; and placing a third I/O request to read said old parity information from said second disk drive, and a fourth I/O request to write said new parity information to said second disk drive, into a second queue associated with said second disk drive, said second queue defining the order of execution of I/O requests for said second disk drive, said third and fourth I/0 requests being scheduled in said second queue for execution after completion of said first I/O request.

7. In a disk array employing a read-modify-write method for updating data and parity information stored upon first and second disk drives, respectively, wherein (a) old data and old parity information are read from said first and second disk drives, respectively, (b) new parity information is generated, and (c) new data and said new parity information are written to said first and second disk drives, respectively, the improvement comprising:

delaying old parity read, new parity generation, and new parity write procedures until the conclusion of old data read procedures.

* * * * *